United States Patent [19]

Ahrens et al.

[11] Patent Number: 4,581,892

[45] Date of Patent: Apr. 15, 1986

[54] ADJUSTABLE FLUID COUPLING

[75] Inventors: Klaus Ahrens, Dorsten; Peter Brychta, Wuppertal, both of Fed. Rep. of Germany

[73] Assignee: Bergwerksverband GmbH, Essen, Fed. Rep. of Germany

[21] Appl. No.: 612,569

[22] Filed: May 21, 1984

[30] Foreign Application Priority Data

May 20, 1983 [DE] Fed. Rep. of Germany ....... 3318462

[51] Int. Cl.$^4$ ...................... F16D 33/00; F16D 33/02
[52] U.S. Cl. ...................... 60/330; 60/338; 60/347; 60/352; 60/357
[58] Field of Search ................. 60/338, 347, 352, 357, 60/361, 359, 365, 330

[56] References Cited

U.S. PATENT DOCUMENTS

| Re. 29,928 | 3/1979 | Bopp | 60/347 |
| 3,405,524 | 10/1968 | Nelden | 60/357 |
| 3,805,928 | 4/1974 | Caradot | 60/357 |
| 4,051,675 | 10/1977 | James | 60/357 |

Primary Examiner—Robert E. Garrett
Assistant Examiner—John M. Husar
Attorney, Agent, or Firm—Karl F. Ross; Herbert Dubno

[57] ABSTRACT

A fluid coupling interposed between an induction motor and a load has an impeller and a turbine together defining a working chamber connected via radially inward and radially outward passages with a delay chamber on the impeller side of a corotating housing. The two sets of passages are selectively blockable by shutters that are controlled by an evaluator, inserted in a space between the motor and load shafts, which also accommodates a power supply consisting of one or more batteries. The evaluator responds to several sensors, measuring such parameters as motor torque, load speed and acceleration, to drain or refill the working chamber.

10 Claims, 1 Drawing Figure

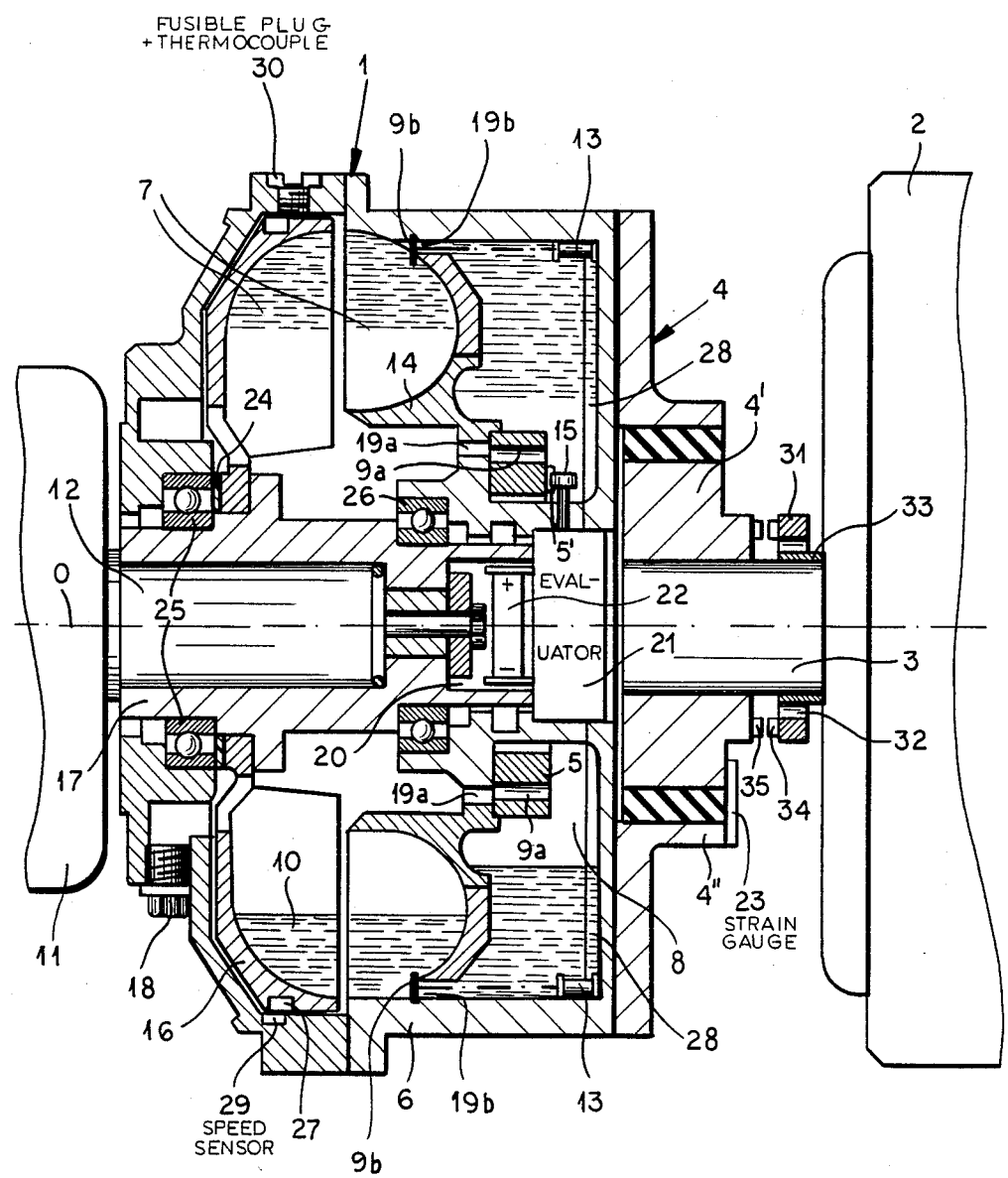

ADJUSTABLE FLUID COUPLING

FIELD OF THE INVENTION

Our present invention relates to an adjustable fluid coupling serving for the transmission of torque between an induction motor and a load, e.g. in underground mining or tunneling.

BACKGROUND OF THE INVENTION

Fluid couplings of the kind here considered, including a motor-driven impeller and a load-connected turbine defining between them a working chamber filled with hydraulic liquid, are often used underground in cases requiring large driving powers in the face of limited network energy feeding the various electric motors involved. These motors are generally of the induction or asynchronous type which have an extended startup period along with a considerable slip range. Such an induction motor, e.g. when connected with a drive shaft of a sprocket operating a chain conveyor alongside a mine face, may be difficult to restart after prolonged standstill, as when rocks dropping onto the conveyor belt include wet coal jamming that belt. In that event the conveyor often must be unloaded by hand before being again set in motion for the delivery of further mined material. It therefore becomes important to optimize the torque-transmission ratio of each fluid coupling for the purpose of minimizing or eliminating the time of production slowdown during which miners working at the conveyor are exposed to the hazard of coal or overburden falling from the mine face. The solution of coupling a pair of such motors with opposite ends of the sprocket shaft is not always sufficient.

In other instances, as where the load being driven by an inducation motor via a fluid coupling is a conveyor with a highly elastic band of rubber of the like, the conveyor itself must be started at a low speed which is progressively increased.

it has already become the practice to provide fluid couplings with an antechamber from which hydraulic liquid can be delivered at a controlled rate, e.g. by means of scoop-type feeders, to the working chamber for varying the torque-transmission ratio between the impeller and the turbine. These assemblies, however, are rather bulky and not practical in many instances, particularly at underground sites in the vicinity of a mine face.

OBJECTS OF THE INVENTION

Thus, an important object of our invention is to provide a fluid coupling which adapts itself to different circumstances by having means for varying the liquid volume in its working space without taking up significant additional space.

A more particular object of our invention is to provide means of this type responding automatically to changes in external conditions to increase or reduce that liquid volume, e.g. in the case of a switchover from an inelastic-belt to an elastic-belt conveyor or vice versa, while being effective even during steady-state operation, as when the power of the driving motor varies on account of fluctuations in the supply network.

SUMMARY OF THE INVENTION

We realize these objects, in a fluid coupling as per our invention, by fixedly connecting its impeller with a corotating housing defining therewith a delay chamber which is connected via a plurality of passages with the working chamber, the passages being selectively blockable by shutter means under the control of an evaluator which is disposed in the housing along with an associated power supply generally consisting of one or more primary or secondary batteries. The evaluator responds to sensing means in the housing continuously monitoring several operating parameters of the impeller and the turbine, such as speed and/or acceleration of the drive and driven shafts, the input torque exerted by the drive shaft and, advantageously, the temperature generated in operation.

According to a more particular feature of our invention, the passages linking the working chamber with the delay chamber include a radially inward set of passages and a radially outward set of passages which can be respectively obstructed by jointly operable first shutters and by jointly operable second shutters. Closure of the radially outward passages and simultaneous opening of the radially inward passages enables liquid from the working chamber to be drained into the delay chamber whereas the reverse situation centrifugally drives hydraulic liquid (referred to hereinafter as oil) from the delay chamber into the working chamber. Thus, the evaluator is able to adapt the filling of the working chamber to the instantaneous requirements on the basis of the values constantly measured by the sensors.

When the delay chamber has a volume equal to or preferably exceeding that of the working chamber, the latter can be completely drained to let the motor idle under virtually no-load conditions, e.g. on startup until the attainment of a predetermined speed. A refilling of the working chamber at a controlled rate will then intensify the torque transmitted to the turbine and set it in motion as soon as the resistance of the load is overcome. If that resistance is initially small, as in the case of the aforementioned elastic-belt conveyor, the turbine will be entrained almost immediately so that the load will be accelerated only gradually and without shock.

Thus, a fluid coupling according to our invention will have various optimum filling volumes for its working chamber, depending on motor and load conditions prevailing at a particular instant, instead of being characterized by a single such optimum volume as is true of known hydraulic couplings.

In accordance with another feature of our invention, the evaluator and its power supply are accommodated in a space extending along the axis of rotation between the driving and driven shafts.

BRIEF DESCRIPTION OF THE DRAWING

The above and other features of our invention will now be described in detail with reference to the accompanying drawing the sole FIGURE of which is an axial sectional view of a fluid coupling representing a preferred embodiment.

SPECIFIC DESCRIPTION

As shown in the drawing, a fluid coupling 1 according to our invention is interposed between an induction motor 2 and a load which may comprise a nonillustrated sprocket of a chain conveyor driven by way of a gear coupling 11. Motor 2 has a drive shaft 3 which is joined to a housing 6 of fluid coupling 1 by means of an elastic coupling 4 compensating for possible inexactitudes in the centering of the housing on the shaft axis 0. Housing 6 is rigid with an impeller 14 confronting a turbine 16 embraced by the housing but rotatable independently thereof. The turbine and the housing jointly define a working chamber 7 which is connected with a delay chamber 8, formed between the impeller and the housing, by a set of radially inward passages 19a and a set of radially outward passages 19b. The actual volume of working chamber 7, which is broken up by the impeller and turbine blades, is preferably not greater than that of delay chamber 8 which may exceed the volume of chamber 7 by several liters in large installations.

Passages 19a and 19b are respectively provided with first and second shutters 9a and 9b controlled by an evaluator 21 as more fully described hereinafter. The evaluator and an associated power supply 22, i.e. one or more batteries which may be rechargeable, are located in a space 20 existing between the free end of drive shaft 3 and that of a hub 17 screwed onto a drive shaft 12 which is connected to gear coupling 11 and is also centered on axis 0. Turbine 16 is seated on hub 17 and is separated by an antifriction ring 24 (which could be replaced by a labyrinth seal) from a ball bearing 25 by which the hub is journaled in housing 6. Another ball bearing 26 supports the impeller 14 on hub 17.

Fluid coupling 1, which in its entirety is rotatable about axis 0, may be surrounded by a stationary enclosure not shown.

Housing 6 is further provided with an inlet for oil 10 which is normally closed by a screw 18.

Evaluator 21 and power supply 22 are connected, via nonillustrated leads extending partly on the inner periphery of housing 6, to a plurality of sensors monitoring diverse operating parameters of impeller 14 and turbine 16. These sensors include a strain gauge 23 which could be mounted directly on drive shaft 3 but is here shown disposed on elastic coupling 4 so as to bridge its resiliently interconnected inner and outer rings 4' and 4". A torque sensor such as strain gauge 23 could also be provided on driven shaft 12. A speed sensor 29 coacts with a set of teeth 27 of turbine 16 to measure its rotary velocity; evaluator 21 can determine from that velocity also the acceleration of driven shaft 12. A temperature sensor comprises a thermocouple forming part of a fusible plug 30 which is screwed into the housing 6 and is designed to melt in the event of a temperature rise beyond a predetermined upper range limit to let oil 10 escape from working chamber 7 as a safety measure. The temperature sensor could also be disposed separately from plug 30 at a different location of housing 6. A temperature drop below a predetermined lower range limit generally calls for the admission of more oil into working chamber 7.

A further sensor, designed as an accelerometer, comprises an outer ring 31 connected via resilient webs 32 with an inner ring 33 fixedly embracing the shaft 3. Outer ring 31, which is quite massive, carries a plurality of teeth 34 which coact capacitively with teeth 35 on ring 4' confronting them on standstill or with constant rotation. When the speed of shaft 3 increases, ring 31 lags angularly behind ring 33 to an extent depending on the rate of that increase.

The several sensors described and illustrated by way of example could, of course, be replaced by other types known in the art and designed to perform similar functions. Speed sensor 29, for instance, might be replaced by a photodetector and a lamp coacting with reflecting markings on turbine 16.

Evaluator 21, continuously receiving data from all these sensors, determines whether the volume of oil 10 in working chamber 7 should be modified. As illustrated by way of example, shutters 9a are apertured portions of a ring 5 which is limitedly rotatable with reference to impeller 14 and has one or more teeth 5' engaged by a pinion 15 that is driven by the evaluator 21 for selectively blocking and unblocking the passages 19a. The shutter-forming apertures of ring 5 could be designed as tapering slots if a gradual blocking is desired; in many instances, however, a binary ON/OFF mode of operation will be satisfactory. Again by way of example, shutters 9b are valves formed by armatures of solenoids 13 controlled from the evaluator via leads 28. Their mode of operation, too, could be progressive or binary.

When the assembly shown in the drawing is first set in motion, all passages are closed and chamber 7 is filled only in part for an easy startup of motor 2. If that assembly is used to drive a load hard to start, e.g. a grinding mill or an inelastic-band conveyor which may even be jammed by adhering coal, sensor 23 detects on startup a rapidly rising torque which the evaluator 21 will find coupled with a stationary or very slowly accelerating turbine as determined by sensor 29. The evaluator will then open the passages 19a to let oil 10 drain from working chamber 7 into delay chamber 8; when the motor speed has increased sufficiently, passages 19a are reclosed and passages 19b are opened to let oil from chamber 8 flow into chamber 7 for intensifying the torque acting upon the turbine. This flow will continue even in the nearly filled state of chamber 7 since the slower rotation of turbine 16 also retards the oil in that chamber and thus reduces the centrifugal force acting thereon. The oil flow stops when chamber 7 is completely filled for maximum torque transmission and minimum speed difference between shafts 3 and 12.

Conversely, when the starting torque is small and the turbine gathers speed soon after the impeller is set in motion, the partly filled chamber 7 will not be drained and will be replenished to its full capacity.

During steady-state operation, shutters 9a and 9b will be opened or closed by evaluator 21 to the extent dictated by the output values of the various sensors described. An unblocking of passages 19b, for instance, will make up leakage losses resulting in a larger differential detected by sensor 29. With two motors driving a common load as discussed above, the operation of the fluid coupling associated with each motor will also be determined by the operating condition of the other assembly of motor and fluid coupling.

It is to be understood that the shutters 9a and 9b may differ from those particularly illustrated by way of example and may be implemented by various types of linearly or angularly movable sliders or valves controlled by evaluator 21. This evaluator may be designed as a simple microprocessor programmed to carry out the operations described above in detail.

If absolute driving speed is to be taken into account, e.g. for enabling the evaluator only after that speed has attained a certain minimum value, a sensor used for this purpose may comprise a photodetector on the outer surface of housing 6 coacting with a light source on the surrounding enclosure. Such a photodetector may also serve as an electronic switch designed to open-circuit the power supply 22 when that external light source is turned off during periods of standstill. At such times the battery or batteries may be rechargeable by way of contacts on the outer housing surface that can be connected to an external source of direct current.

We claim:

1. In a fluid coupling interposed between an induction motor provided with a drive shaft centered on an axis and a load provided with a driven shaft centered on said axis, and including a bladed impeller connected with said drive shaft and a bladed turbine connected with said driven shaft, said impeller and said turbine having their bladed sides confronting each other and defining a working chamber between them;

the improvement comprising that:

a housing surrounds said impeller and is rigidly connected therewith for corotation thereof as a unit, said housing defining with the side of said impeller facing away from said turbine a delay chamber, and said impeller/housing unit being provided with a plurality of passages establishing communication between said working and delay chambers;

inlet means on said housing for admitting a hydraulic liquid into said working chamber;

movable shutter means disposed in said housing for selectively unblocking and blocking said passages to permit either flow of liquid from said working chamber to said delay chamber or flow of liquid from said delay chamber to said working chamber;

sensing means in said housing for continuously monitoring several operating parameters of said impeller and said turbine;

a power supply in said housing; and an evaluator in said housing responsive to said sensing means and connected to said power supply for repositioning said shutter means, in response to the monitored parameters, to appropriately control the flow of liquid from said working chamber to said delay chamber and vice versa during startup and under varying load and motor conditions, said power supply comprising at least one battery disposed together with said evaluator in a space between said drive shaft and said driven shaft.

2. The improvement defined in claim 1 wherein said passages include a radially outward set of passages and a radially inward set of passages, said shutter means comprising first shutters jointly operable by said evaluator to obstruct said inward set of passages and second shutters jointly operable by said evaluator to obstruct said outward set of passages.

3. The improvement defined in claim 1 wherein said housing is connected with said drive shaft by way of an elastic coupling.

4. The improvement defined in claim 1 wherein said delay chamber has a volume at least equal to that of said working chamber.

5. The improvement defined in claim 2 wherein said sensing means comprises a torque sensor connected with said drive shaft, a speed sensor coacting with said turbine, and an accelerometer coupled with said impeller.

6. The improvement defined in claim 5 wherein said sensing means further comprises a temperature sensor.

7. In a fluid coupling interposed between an induction motor provided with a drive shaft centered on an axis and a load provided with a driven shaft centered on said axis, and including a bladed impeller connected with said drive shaft and a bladed turbine connected with said driven shaft, said impeller and said turbine having their bladed sides confronting each other and defining a working chamber between them;

the improvement comprising that:

a housing surrounds said impeller and is rigidly connected therewith for corotation thereof as a unit, said housing defining with the side of said impeller facing away from said turbine a delay chamber, and said impeller/housing unit being provided with a plurality of passages establishing communication between said working and delay chambers;

inlet means on said housing for admitting hydraulic liquid into said working chamber;

movable shutter means disposed in said housing for selectively unblocking and blocking said passages to permit either flow of liquid from said working chamber to said delay chamber or flow of liquid from said delay chamber to said working chamber;

sensing means in said housing for continuously monitoring several operating parameters of said impeller and said turbine;

a power supply in said housing; and an evaluator in said housing responsive to said sensing means and connected to said power supply for repositioning said shutter means, in response to the monitored parameters, to appropriately control the flow of liquid from said working chamber to said delay chamber and vice versa during startup and under varying load and motor conditions, said sensing means comprising a torque sensor responsive to said drive shaft, a speed sensor responsive to said turbine, and an accelerometer responsive to said impeller, said passages including a radially inward set of passages and a radially outward set of passages, said shutter means comprising first shutters jointly operable by said evaluator to obstruct said radially inward set of passages, and second shutters jointly operable by said evaluator to obstruct said radilly outward set of passages, said power supply comprising at least one battery disposed together with said evaluator in a space between said drive shaft and said driven shaft, said battery and said evaluator being connected to said impeller/housing unit for rotation therewith.

8. The improvement defined in claim 7 wherein said housing is connected with said drive shaft by way of an elastic coupling.

9. The improvement defined in claim 7 wherein said delay chamber has a volume at least equal to that of said working chamber.

10. The improvement defined in claim 7 wherein said sensing means further comprises a temperature sensor.

* * * * *